Figure 1:
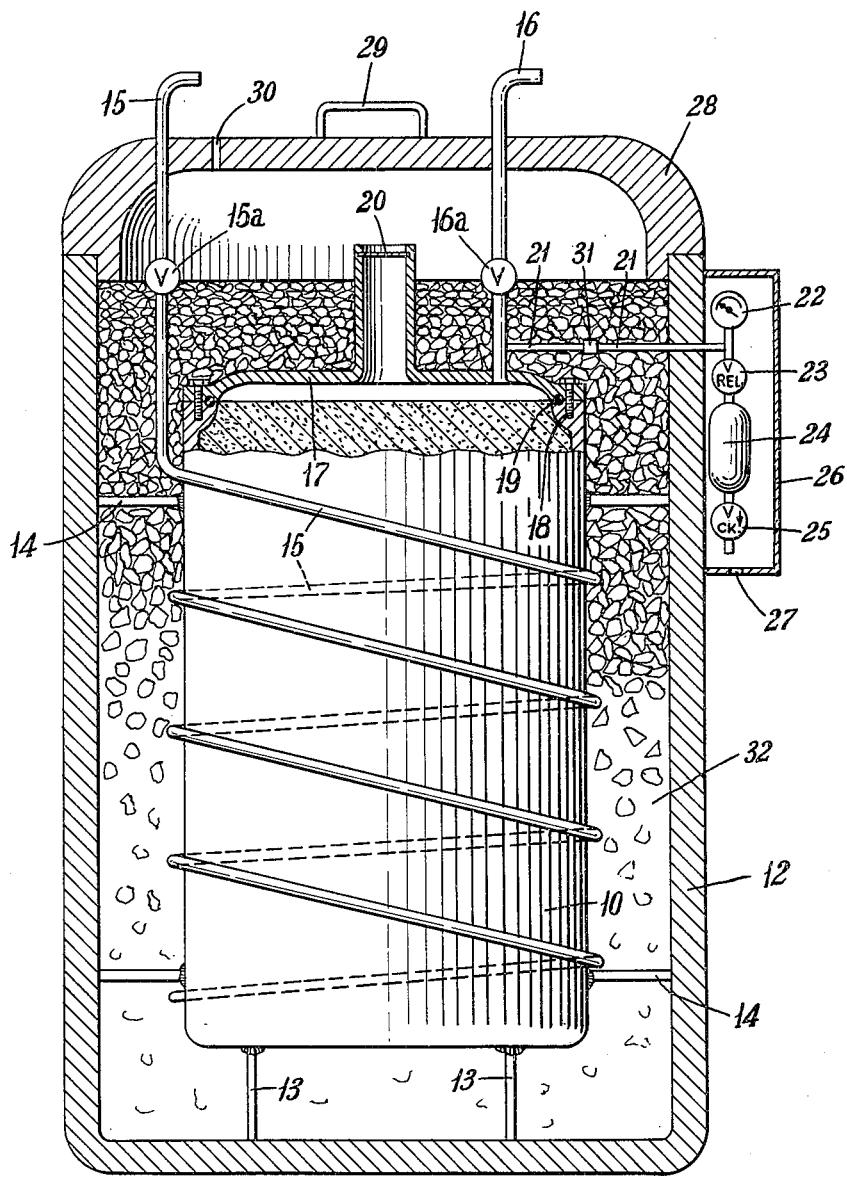

INVENTOR.
GERHARD A. COOK

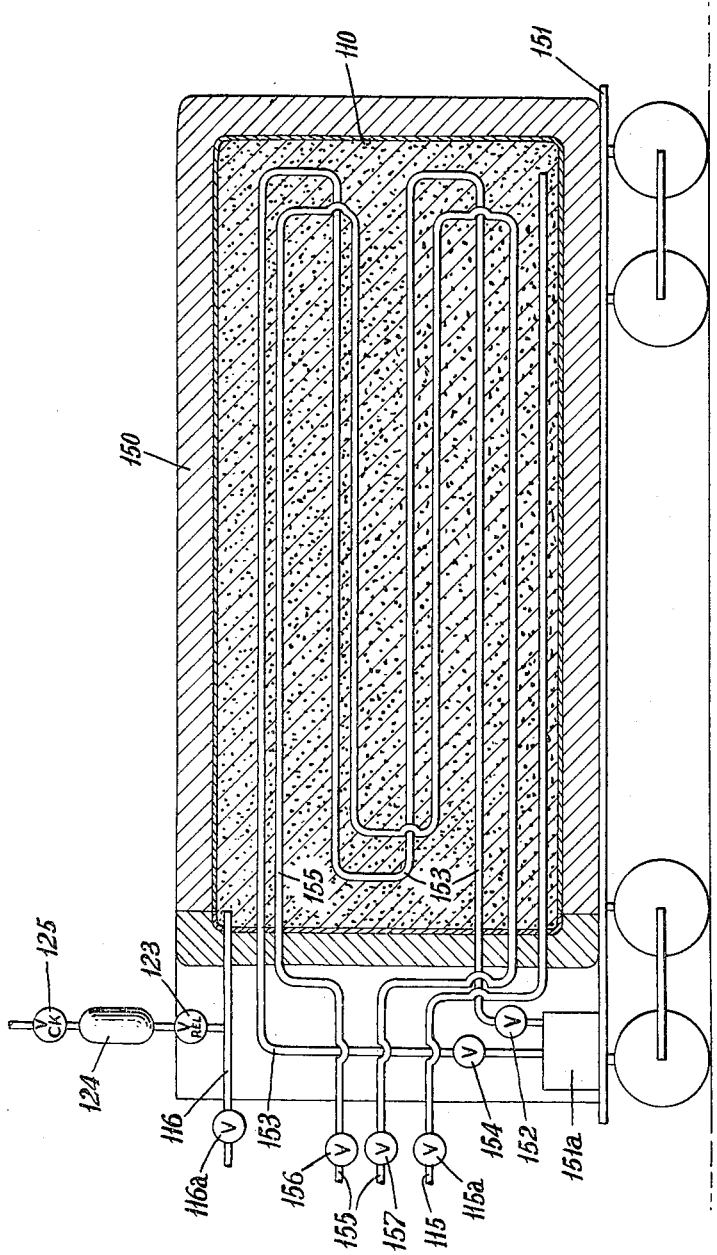

United States Patent Office

3,006,153
Patented Oct. 31, 1961

3,006,153
METHOD AND APPARATUS FOR STORING AND TRANSPORTING OZONE
Gerhard A. Cook, Clarence, N.Y., assignor to Union Carbide Corporation, a corporation of New York
Filed Aug. 29, 1960, Ser. No. 52,596
11 Claims. (Cl. 62—48)

This invention relates to a method and apparatus for the storage and transportation of ozone. More specifically, it relates to a method of storing and transporting ozone while it is adsorbed on a material which is particularly suited for use in transporting ozone safely.

In recent years the consumption of ozone has greatly increased. Ozone is now widely used in carrying out certain chemical reactions. For example, several tons of ozone per day are used in the ozonation of oleic acid. Ozone for use in chemical reactions is now universally produced in ozone generators on the site of the use. These generators represent a fairly large investment, and they consume a considerable quantity of electrical energy. Greater utilization of ozone would be encouraged if a practical method of transporting it were available, so that the user would not have to generate his own ozone. There is, therefore, a need for a safe and convenient method of transporting ozone for use at locations where there are no ozone generators.

Several methods for the storage and transport of ozone have been proposed in the past. These methods have certain drawbacks which have, so far, prevented any of them from being put to extensive use. For example, liquid ozone can be transported in solution in liquid oxygen as long as dilution with oxygen is sufficiently great to prevent explosion of the ozone in the presence of sparks of static electricity or other stimuli. If the protective oxygen is allow to evaporate off from the ozone, high-concentration liquid ozone will be left behind. This high-concentration liquid ozone is a powerful explosive which is easily detonated by even very weak stimuli. Thus if the truck or railway tank car carrying a solution of ozone in liquid oxygen should be in a collision or other accident, the ozone container might develop a leak, with disastrous consequences.

Another method which has previously been proposed for storing and transporting ozone involves use of a container filled with ozone gas and packed with hollow particles having a surface which is not catalytic for ozone decomposition at reduced temperatures, the surface also having sufficient area per unit volume to act as an ozone-decomposition "chain breaker." The packing thus prevents explosions in the ozone. The disadvantage of this method lies in the low payload of ozone. The pressure of the ozone in the container cannot be much greater than one atmosphere, because at appreciably higher pressures of ozone the packing material is no longer able to prevent explosions. Extensive dilution of the ozone with oxygen gas would make the package safer but would still further decrease the quantity of ozone which could be carried per pound of total container weight.

Ozone can also be transported in the adsorbed phase using silica gel as the adsorbing material. The container must be refrigerated so that the silica gel is able to adsorb a reasonable amount of ozone. A serious disadvantage of this system is that if the refrigeration should fail at any time, the ozone is desorbed and the pressure of gaseous ozone in the container increases to a dangerous level. Gaseous ozone, unless it is at very low pressures or greatly diluted, is readily detonated, even by weak stimuli.

A principal object of this invention is to provide an improved system for safely storing and transporting ozone.

Another object is to provide an improved system for safe storage and transportation of ozone in the adsorbed state, thereby increasing the efficiency and economy of ozone handling.

A still further object is to provide an improved storage and transportation system for ozone wherein a dangerously high concentration of gaseous ozone does not form in the event of refrigeration failure.

Additional objects and advantages of the invention will become apparent from the following disclosure and the appended claims.

In the drawings,

FIG. 1 is a cross-sectional view with parts in elevation of apparatus according to the present invention; and FIG. 2 is a cross-sectional view with parts in elevation of modified apparatus.

The present process for storing ozone contemplates the steps of providing a body of adsorbent material and an ozone-containing feed gas, and contacting such feed gas with the adsorbent body at a temperature below $-50°$ C. thereby adsorbing the ozone. At least part of the adsorbent body has an ozone-decomposing activity whereby the rate of decomposition is (1) less than 5% by weight of the total adsorbed ozone at temperatures below $-75°$ C. per 24 hours, (2) between 5% and 25% by weight of the total adsorbed ozone at temperatures between $-50°$ C. and $-25°$ C. per 24 hours, and (3) at least 1% by weight of the total adsorbed ozone per minute at temperatures above $0°$ C., all rates being based on the total quantity of ozone adsorbed at the beginning of that particular period. The ozone-containing adsorbent body is maintained at a temperature below about $-50°$ C. during the entire ozone storage period.

In the instant invention, ozone is transported in the adsorbed phase in a refrigerated container, and in addition, a novel type of protection is furnished to make the container safe. This protection consists in a provision by means of which, if the refrigeration should fail and the adsorbent temperature should rise, part or all of the desorbed ozone is catalytically decomposed before its partial pressure can reach a dangerous value. The process of this invention is either safer, more economical, or both, as compared to any of the methods heretofore known for storing and transporting ozone.

To practice this invention, materials or combinations of materials are employed which embody the unique combined characteristics of adsorbing ozone extensively at temperatures below $-50°$ C., and decomposing ozone if the temperature should rise above $-50°$ C. Examples of such materials are synthetic crystalline zeolites having apparent pore diameters of 4.0 Angstrom units or greater, in which at least one-half of the metal cations have been replaced by hydrogen ions.

The term apparent pore size as used herein may be defined as the maximum critical dimension of the molecular species which is adsorbed by the zeolitic molecular sieve in question under normal conditions. The apparent pore size will always be larger than the effective pore diameter, which may be defined as the free diameter of the appropriate silicate ring in the zeolite structure.

It has been unexpectedly discovered that certain crystalline zeolites have a remarkably high affinity and selectivity for ozone as compared to oxygen, from which ozone may be produced. This is true even though the critical dimensions of the two molecules are of the same order of magnitude and both can be adsorbed on zeolites of 4 Angstrom pore size.

The term "zeolite," in general, refers to a group of naturally occurring and synthetic hydrated metal aluminosilicates, many of which are crystalline in structure. There are, however, significant differences between the various synthetic and natural materials in chemical composition, crystal structure and physical properties such as X-ray powder diffraction patterns.

The structure of crystalline zeolitic molecular sieves may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules. Any of this space not occupied by reduced elemental metal atoms will be available for adsorption of molecules having a size, shape and energy which permits entry of the adsorbate molecules into the pores of the molecular sieves.

The zeolites occur as agglomerates of fine crystals or are synthesized as fine powders and are preferably tableted or pelletized for large scale adsorption uses. Pelletizing methods are known which are very satisfactory because the sorptive character of the zeolite, both with regard to selectivity and capacity, remains essentially unchanged.

The pore size of the zeolitic molecular sieves may be varied by employing different metal cations. For example, sodium zeolite A has an apparent pore size of about 4 Angstrom units whereas calcium zeolite A has an apparent pore size of about 5 Angstrom units.

Among the naturally occurring zeolitic molecular sieves suitable for use in the present invention include mordenite and chabazite both having an apparent pore size of about 4 Angstrom units, and erionite having an apparent pore size of about 5 Angstrom units. The natural materials are adequately described in the chemical art. Suitable synthetic crystalline zeolitic molecular sieves include zeolites A, D, K, T, X and Y.

Zeolite A is a crystalline zeolitic molecular sieve which may be represented by the formula:

$$1.0 \pm 0.2 M_{\frac{2}{n}}O : Al_2O_3 : 1.85 \pm 0.5 SiO_2 YH_2O$$

where M represents a metal, $n$ is the valence of M, and Y may have any value up to about 6. The as-synthesized Zeolite A contains primarily sodium ions and is designated sodium Zeolite A. All of the monovalent cation forms of Zeolite A have an apparent pore size of about 4 Angstroms, excepting the potassium form which has a pore size of about 3 Angstroms and consequently is unsuitable for use in the present invention. When at least about 40 percent of the monovalent cation sites are satisfied with di- or trivalent metal cations, zeolite A has an apparent pore size of about 5 Angstroms. Zeolite A is described in more detail in U.S. Patent No. 2,882,243 issued April 14, 1959, to R. M. Milton.

Zeolite D has an apparent pore size of about 4 Angstroms, and is described and claimed in U.S. patent application Serial No. 680,383 filed August 26, 1957.

Zeolite L has an apparent pore size of about 10 Angstroms, and is described and claimed in U.S. patent application Serial No. 711,565 filed January 28, 1958.

Zeolite R has an apparent pore size of about 4 Angstroms, and is described and claimed in U.S. patent application Serial No. 680,381 filed August 26, 1957.

Zeolite T has an apparent pore size of about 5 Angstroms, and is described and claimed in U.S. patent application Serial No. 733,819 filed May 8, 1958, now Patent No. 2,950,952.

Zeolite X has an apparent pore size of about 10 Angstroms, and is described and claimed in U.S. Patent No. 2,882,244 having issued April 14, 1959, to R. M. Milton.

Zeolite Y has an apparent pore size of about 10 Angstroms, and is described and claimed in U.S. patent application Serial Nos. 728,057 and 862,062 filed respectively on April 14, 1958, and December 28, 1959.

In their ordinary form, crystalline zeolite usually have cations, such as sodium ions or calcium ions, throughout their structure. These zeolites are effective catalysts for decomposing ozone at room temperature and at temperatures as low as −78° C. and lower. It has been unexpectedly found, however, that the ozone-decomposing catalytic activity of a zeolite can be greatly reduced by replacing at least one-half of the metal cations with hydrogen ions. In fact, the degree of catalytic activity can be controlled by the extent to which the metallic cations have been replaced by hydrogen ions, the catalytic activity decreasing as the concentration of cations decreases. If less than one-half of the metal cations are replaced, the ozone decomposition activity of the zeolite is prohibitively high for practicing the invention. That is, an excessive portion of the ozone stored at temperatures below −50° C. would decompose to oxygen.

More specifically, a preferred type of adsorbent which may be used in this invention is Zeolite X in which at least one-half of the metal cations have been replaced by hydrogen ions.

The above-listed zeolites such as Zeolite X have suitable voids or pores for the inclusion of ozone molecules, but it was found experimentally that ozone is rapidly and quantitatively decomposed in contact with the sodium ion form of this zeolite, even at low temperatures approximating −50° C. Substantial replacement of the sodium ions with hydrogen ions in Zeolite X unexpectedly modified its characteristics so that ozone can be safely stored in concentrations of up to 10 lb. of ozone per 100 lb. zeolite, and recovered again without substantial decomposition of the ozone at temperatures below about −50° C. Yet, this same hydrogen-ion-exchanged zeolite "X" is an effective decomposition catalyst for ozone at temperatures above about 0° C.

Hydrogen-ion-exchanged Zeolite X may be prepared in the following manner. 100 g. of 1/16 in. Sodium X pellets were stirred into one liter of 1 M aqueous ammonium chloride solution at 25° C. The supernatant liquid was decanted after one hour and the pellets reslurried with one liter of 1 M ammonium chloride solution at 100° C. for 1 hour. The liquid was again decanted and the pellets were again slurried with one liter of 1 M ammonium chloride solution for 6 hours at 25° C. The pellets were then filtered off and dried at 110° C. for 16 hours. The pellets were placed in a horizontal tube furnace and heated in a stream of hydrogen at 400° C. for 3½ hours until ammonia could no longer be detected in the effluent hydrogen. The pellets were removed hot and sealed in a glass container. Analysis of the product showed that 69.7% of the metal cation content had been changed to hydrogen ion, the remainder being sodium ion.

By similar methods, any proportion from 0 to 90% of the metallic cations can be replaced by hydrogen ions. The more of the metal ions that are replaced, the less active the zeolite is as an ozone-decomposition catalyst.

Example I describes an experiment illustrating the present invention and using the hydrogen-ion-exchanged zeolite prepared in the previously described manner.

*Example I*

A one gram portion of the hydrogen-exchanged zeolite pellets previously activated at 400° C. was placed in a glass tube externally cooled by a Dry Ice-acetone bath. A gaseous ozone-oxygen mixture was passed through the tube until the concentration of ozone in the effluent gas became constant (at approximately 3.7 mole-percent) and substantially equal to the ozone concentration in the entering gas. The ozone was then desorbed by blowing a stream of oxygen through the zeolite. The amount of ozone thus desorbed was measured and found to correspond to a loading of 9.8 g. ozone per 100 g. zeolite. In another test, a loading of 8 g. ozone/100 g. zeolite was found. A commercial grade of silica gel adsorbs about 7.0 g./100 g. under the same test conditions, so that high loadings are attainable by practicing this invention.

Further experiments showed that this particular sample of hydrogen-ion-exchanged zeolite still had slight catalytic activity for ozone decomposition at −78° C. This activity was very low compared to the activity of the original Zeolite X. The catalytic activity could be further reduced by replacing still more of the metal cations by hydrogen ions.

Other experiments showed that the hydrogen-ion-exchanged zeolite prepared in the aforedescribed manner is an efficient decomposer of ozone at 0° C., and that its ozone-decomposing catalytic activity increases as the temperature increases.

Thus in one embodiment of this invention, the space in a container capable of being refrigerated is filled with Zeolite X in which at least one-half of the cations have been replaced with hydrogen ions. To load the container with ozone, the zeolite is refrigerated to a suitable temperature, such as −78° C., and a stream of ozone-containing oxygen is passed through the bed of zeolite. The zeolite adsorbs ozone in preference to either oxygen or nitrogen, as previously discussed. The unadsorbed oxygen may, if desired, be returned to an ozone generator, where more ozone will be generated. The container may be transported at will, and the ozone may thus be stored for an indefinite period of time as long as sufficient refrigeration is supplied to prevent the ozone from desorbing to an appreciable extent from the zeolite.

When the adsorbed ozone is needed, it may either be desorbed in a stream of dry gas, such as oxygen or nitrogen, or the ozone may be pumped off the zeolite bed. Even at temperatures as low as −78° C. and somewhat lower, the ozone adsorbed on the zeolite has a definite vapor pressure, depending on the loading of ozone on the zeolite, and on the temperature. Thus, when a stream of dry oxygen is blown through the container, ozone mixes with the oxygen and is blown out. If it be desired to raise the concentration of ozone in the off-gas, the zeolite bed may be allowed to warm up a few degrees (but not enough to catalytically decompose the ozone), thus increasing the vapor pressure of the ozone above the zeolite. As the gaseous ozone is swept out of the container, more ozone continually evaporates, until all the ozone has been desorbed from the zeolite.

It is thus seen that the adsorption step, the transportation step, and the final desorption can all be carried out at some constant convenient temperature such as −78° C., little or no ozone being decomposed at any time. However, if the refrigeration should for any reason fail and ozone thus be desorbed into the gas phase, the ozone, instead or reaching a pressure at which it might violently explode, would be gradually decomposed, forming ordinary oxygen. The pressure of the oxygen thus formed is limited by suitable means on the container, such as a safety release valve.

In accordance with another embodiment of this invention, the ozone container may be packed with materials other than crystalline zeolites, said materials accomplishing the same purpose as the hydrogen-ion-exchanged zeolite. One such packing material is a combination of silica gel, which is a known adsorbent for ozone, and a known ozone-decomposition catalyst with catalytic activity adjusted as explained hereinafter. Most of the space in the container is preferably occupied by the silica gel. The catalyst could either be mixed with the silica gel, placed in one or more separate layers, or otherwise disposed inside the container. Hereafter, when a mixture of silica gel and catalyst is referred to, the meaning of the word "mixture" is intended to include any convenient arrangement of the two components, silica gel and ozone-decomposition catalyst, whether intimately mixed, or in separate layers, or arranged in any other manner within the container.

The activity of the ozone-decomposition catalyst is adjusted to be essentially zero at the temperature, e.g., −78° C., at which the ozone is to be adsorbed on the silica gel. At higher temperatures the catalyst would gradually become active, so that by the time the temperature approaches ambient temperatures (0 to 25° C.) the catalyst becomes sufficiently active to decompose all the ozone that it contacts within a few hours. Under normal operating conditions, the container is preferably maintained at a temperature such as −78° C., at which ozone is readily adsorbed on silica gel. More specifically, ozone decomposition catalysts suitable for practicing this invention should have an ozone decomposing activity whereby the rate of decomposition is (1) less than 5% by weight of the total adsorbed ozone per 24 hours at temperatures below −75° C., (2) between 5% and 25% by weight of the total adsorbed ozone per 24 hours at temperatures between −50 and −25° C., and (3) at least 1% by weight of the total adsorbed ozone per minute at temperatures above 0° C. The previously discussed hydrogen exchanged crystalline zeolitic molecular sieves satisfy these requirements.

One suitable ozone-decomposition catalyst for practicing this embodiment is manganese dioxide mounted on an inert catalyst support such as porous aluminum oxide. The catalytic activity of manganese dioxide can be adjusted by such methods as varying the proportion of manganese dioxide on the catalyst support, varying the pore-size of the catalyst support, and changing the temperature at which the catalyst is activated. The catalyst may be prepared by impregnating the support with an aqueous solution of manganese nitrate, drying the resulting material, and then heating it in air to decompose the nitrate and produce the manganese dioxide.

A third type of packing material suitable for carrying out the objects of this invention is a mixture of silica gel and hydrogen-ion-exchanged zeolite.

Another suitable ozone decomposition catalyst is silica gel with a small proportion of soda-lime added to adjust the catalytic activity. Still another method of obtaining a suitable catalyst is to treat silica gel with a dilute aqueous solution of sodium hydroxide, dry the treated material and reactivate the silica gel by further heating to a temperature of about 450° F. This procedure changes the silica gel so as to be slightly alkaline and accordingly increases its ozone decomposition activity.

It has been discovered that the crystalline zeolites gradually lose their adsorption capacity for ozone. This is probably due to adsorption of traces of moisture in the gases which are passed into and through the container. Zeolites are known to adsorb moisture very strongly, and moisture, if adsorbed, occupies some of the space that would be taken by ozone. In order to restore the zeolite substantially to its original adsorptive condition, it may be regenerated, as, for example, by passing a stream of dry oxygen, nitrogen, or other gas through the bed of zeolite at a temperature of about 500° F.

Similarly, silica gel also adsorbs moisture that enters the container. The silica gel must also be occasionally regenerated, regeneration being conducted at temperatures of 250 to 450° F.

The ozone capacity of both crystalline zeolite and of silica gel increases as the temperature is lowered and can reach values as high as 30 pounds per 100 pounds of adsorbent at temperatures well below −100° C. The question therefore arises as to how high the adsorbent may safely be loaded. This question does not have a precise answer, since the resistance to explosion of a given loading depends upon such things as the nature of the stimulus that might bring about the explosion and the temperature of the gel at the time the stimulus occurs. Experiments have indicated that loadings below 10 lb. ozone per 100 lb. adsorbent are safe under the conditions of this invention, provided the container is equipped with a suitable bursting disc to relieve any sudden pressure that might be developed by rapid ozone desorption and decomposition induced by violent stimuli such as dynamite explosions. Under ordinary storage and transportation conditions, no major stimuli that might suddenly desorb the ozone would be expected, and the container would therefore be quite safe at loadings below about 10 lb. ozone per 100 lb. adsorbent.

If the train or truck carrying the ozone container provided by this invention should be wrecked so that the refrigeration fails, the ozone would gradually be desorbed and decomposed, as described above. If the accident should rupture the container so that adsorbent loaded with ozone should spill out, the ozone would gradually be desorbed and evaporate into the air. If the adsorbent is the hydrogen-ion-exchanged zeolite previously described, or if the adsorbent is mixed with the hydrogen-exchanged zeolite or with a known ozone-decomposition catalyst, at least a portion of the ozone would be decomposed into oxygen before it entered the atmosphere, thus reducing atmospheric contamination.

The lower the temperature, the safer the ozone container at any given ozone loading, since the danger of explosion, at least at loadings below about 20 lb. ozone per 100 lb. adsorbent, lies largely in the gas phase. Ozone, while in the adsorbed phase at loadings below 20 lb. per 100 lb. gel, does not detonate; the danger in loss of refrigeration or in severe stimuli lies in the fact that enough ozone may be desorbed to raise the partial pressure of ozone in the gas phase to a dangerous level.

FIG. 1 illustrates diagrammatically one form of ozone container constructed in accordance with the present invention. This container consists of an inner vessel 10 formed of material suitable for low-temperature service, e.g., stainless steel or aluminum. Inner vessel 10 is supported inside and in spaced relation to larger casing 12 by longitudinal members 13 and spacers 14. The inner vessel 10 is supplied with a conduit 15 and control valve 15a therein for admitting gas when the container is being charged with ozone. Conduit 15 is coiled around the outside of inner vessel 10 and enters such vessel near the bottom thereof. The inner vessel 10 is also provided with a vent tube 16 communicating with the upper end thereof and containing control valve 16a. The cover 17 of inner vessel 10 is removable; it is tightly attached by means of screws 18 and is sealed to the main body of the vessel by an O-ring 19 made of ozone-resistant material. The cover is equipped with a bursting disc 20 set to rupture at a suitable pressure, e.g. 50 p.s.i.g. Branch conduit 21 in two sections communicates at one end with vent tube 16, and the other end contains pressure gage 22 and pressure-release valve 23 set to allow gas to escape from the inner vessel 10 if the pressure in the vessel reaches a predetermined value, e.g. 15 p.s.i.g. The discharge side of valve 23 communicates with one end of chamber 24 containing an active catalyst for ozone decomposition. Check-valve 25 is attached to the opposite end of catalyst chamber 24 to prevent air from entering the system. The pressure gage-catalyst chamber assembly is external to casing 12, and is protected against physical abuse by removable cover 26 having an opening 27 therein to permit escape of gas.

If desired, outer casing 12 may in turn be surrounded by a layer of insulating material (not shown) to minimize heat inleak. Outer casing 12 is provided at its upper end with cover 28 which is not secured but readily removable by means of handle 29. Cover 28 has drilled passageway 30 to permit escape of vaporized refrigerant such as gaseous carbon dioxide from Dry Ice.

To employ the container of FIG. 1 for storing and transporting ozone according to the invention, inner vessel 10 may, for example, be filled with one of the following: (1) a hydrogen-ion-exchanged zeolite, (2) a mixture of hydrogen-ion-exchanged zeolite and silica gel, or (3) a mixture of silica gel and a catalyst known to effectively decompose ozone at temperatures above 0° C. but not appreciably active for ozone decomposition at −50° C. Cover 17 is then screwed down tight, and the outer section of branch conduit 21 is inserted through an opening in the wall of outer casing 12 and attached to the inner section of branch conduit by connector 31. The annular space 32 between the inner vessel 10 and the inner walls of outer casing 12 is then packed with solid carbon dioxide (Dry Ice).

When the inner vessel 10 has cooled sufficiently, an ozone-containing gas such as a mixture of ozone and oxygen from an ozone generator is admitted through conduit 15. The mixture is precooled in the coiled section and then enters the inner vessel 10 at the bottom thereof. The ozone is adsorbed by the packing material, but almost none of the oxygen is adsorbed. The oxygen is vented through conduit 16 and may, if desired, be returned to the ozone generator. At first there is practically no ozone in the gas discharged through conduit 16, but after the adsorbent in inner vessel 10 has adsorbed most of the ozone which it can retain at the existing temperature, the ozone "breaks through" and appears in the gas leaving through conduit 16. This gas may then, if desired, be fed to another ozone container to remove the ozone before it is returned to the ozone generator.

A preferred method of determining the loading of ozone is to meter the gas leaving through conduit 16 and to record continuously the ozone concentration in both the inlet and outlet gas. The ozone analysis and recording of the analysis can be done automatically by methods known to those skilled in the art. From the data thus obtained one can readily calculate how much ozone was adsorbed on the adsorbent in inner vessel 10.

When the concentration of ozone is about 4 mole-percent in the feed gas, and if the ozone-oxygen mixture is allowed to flow through the inner vessel 10 until the concentration of ozone in the gas discharged through conduit 16 is substantially the same as in the feed gas, the loading will usually be about 7 to 10 lb. ozone per 100 lb. adsorbent, and the partial pressure of ozone in vessel 10 will be about 30 mm. of mercury.

When the loading of the container has been completed, valves 15a and 16a are closed and the container may be stored or shipped as desired. The space around and above the inner vessel 10 should be kept full of Dry Ice during the period of ozone storage. As long as the container is packed with Dry Ice and is not damaged, it is safe. When it is desired to use the ozone, the latter may be desorbed by a stream of dry oxygen, nitrogen, or other dry gas which is blown in through conduit 16. The dry gas is not precooled; in fact, it supplies the heat required for desorbing the ozone. The dry gas picks up ozone until the concentration of ozone is about the same as the concentration in the feed gas used originally to charge the container, and the ozone-containing mixture leaves the inner vessel 10 through conduit 15. All the ozone may thus be removed from the container without removing the Dry Ice.

During storage and transit there may be a small amount of ozone decomposition in the container. The decomposition of ozone produces oxygen, which will gradually increase in pressure. If a pressure increase occurs, it may be seen on pressure gage 22. If the pressure in vessel 10 exceeds a predetermined value, e.g. 15 p.s.i.g., gas in the container flows out through the safety-release valve 23. Any ozone in the gas is decomposed in vessel 24 before escaping through check-valve 25, so that no ozone is vented to the atmosphere.

If Dry Ice is not supplied while the ozone is being stored or transported, the container will finally become warm, and ozone will be desorbed. Most of the desorbed ozone will be decomposed, as previously explained, by the zeolite or other ozone decomposition catalyst in inner vessel 10. Any ozone that is not decomposed in inner vessel 10 will be decomposed in chamber 24 before escaping to the atmosphere. Thus in the event of loss of refrigeration, the ozone package "fails safe." In the event that the safety valve 23 fails, the internal pressure will eventually burst disc 20, and some ozone will escape to the atmosphere. This, however, is an unlikely contingency.

If the adsorbent in inner vessel 10 should lose its ozone-adsorbing capacity, the adsorbent may for example be reactivated by heating to a suitable temperature, e. g. to 250–450° F. for silica gel or to 500° F. for zeolite in a stream of dry gas.

FIG. 2 illustrates another embodiment of the invention, elements similar to elements in the FIG. 1 embodiment having been assigned the same identification number plus one hundred. An insulated tank 150 is mounted on a railway car or on a truck trailer 151. The inner vessel 110 is preferably filled with silica gel mixed with either a well-known catalyst for ozone decomposition such as manganese dioxide, or with silica gel mixed with hydrogen-ion-exchanged zeolite, rather than with hydrogen-ion-exchanged zeolite alone, because the temperature required to reactivate silica gel is lower than the temperature required to reactivate the zeolite to the point where the zeolite has its greatest capacity for adsorbing ozone. The tank 150 is provided with aluminum or stainless steel pipes or tubes which serve as conductors for a refrigerating fluid such as a halogenated hydrocarbon or ammonia supplied by the refrigeration machine 151a. The cold refrigerant from the refrigeration machine 151a leaves through a valve 152 by conduit 153 and returns through valve 154 for recondensation. Conduit 153 is suitably disposed in inner vessel 110 for example in the form of coils so as to substantially uniformly cool the surrounding bed of adsorbent material.

To charge the container 150 with ozone, the ozone feed mixture enters through conduit 115 having valve 115a therein. The ozone is adsorbed on the packing material in the tank 150, and the unadsorbed oxygen is vented through conduit 116 having valve 116a therein. When the ozone is to be used, dry oxygen or other dry gas is blown in through conduit 116; the dry gas desorbs the ozone and carries it out through conduit 115. The adsorbent material may be heated, if desired, by flowing steam or hot gas into the heating conduit 155 through inlet valve 156 and outwardly through discharge valve 157.

If the refrigeration should fail, most of the described ozone is decomposed to oxygen which escapes through the pressure-release valve 123 into chamber 124, where an active ozone-decomposing catalyst decomposes any remaining ozone before the gas escapes to the atmosphere through check valve 125. The tank is equipped with various necessary accessories not shown in FIG. 2 but well-known to those skilled in the art, such as a pressure gage, a bursting disc to relieve the pressure in case safety valve 123 should fail to open, and a man-hole cover.

In general, operation of the large tank 150 is similar to that of the small container shown in FIG. 1, but the refrigeration and heating systems give the larger container more flexibility. For example, in the FIG. 2 tank the adsorbent may be cooled to temperatures below —78° C., thus increasing its capacity for ozone. Steam or heated air may be passed through conduit 155 to raise the temperature of the adsorbent just before and during the desorption process. In this way the concentration of ozone in the desorbing gas may be increased. The heating pipes may also be used, when necessary, to reactivate the adsorbent.

Although preferred embodiments of the invention have been described in detail, it is contemplated that modifications of the process and apparatus may be made and that some features may be employed without others, all within the spirit and scope of the invention.

What is claimed is:

1. A process for storing ozone including the steps of providing a body of adsorbent material; providing an ozone-containing feed gas and contacting such feed gas with the adsorbent body at a temperature below about —50° C. thereby adsorbing said ozone, at least part of said adsorbent body having an ozone-decomposing activity whereby the rate of decomposition is (1) less than 5% by weight of the total adsorbed ozone per 24 hours at temperatures below —75° C., (2) between 2% and 20% by weight of the total adsorbed ozone per 24 hours at temperatures between —50 and —25° C., and (3) at least 1% by weight of the total adsorbed ozone per minute at temperatures above 0° C. when the ozone loading is at least one pound per 100 pounds of said adsorbent body; and maintaining the ozone-containing adsorbent body at a temperature below about —50° C. during the ozone storage.

2. A process according to claim 1 whereby said adsorbent body is a crystalline zeolitic molecular sieve having an apparent pore size of at least 4 Angstrom units, and in which at least one-half of the metal cations have been replaced by hydrogen ions.

3. A process according to claim 1 wherein said adsorbent body is Zeolite X in which at least one-half of the metal cations have been replaced by hydrogen ions.

4. A process according to claim 1 wherein said adsorbent body is a mixture of silica gel, and a crystalline zeolitic molecular sieve having an apparent pore size of at least 4 Angstrom units and in which at least one-half of the metal cations have been replaced by hydrogen ions.

5. A process according to claim 1 wherein said adsorbent body is a mixture of silica gel, and Zeolite X in which at least one-half of the metal cations have been replaced by hydrogen ions.

6. A process according to claim 1 wherein silica gel comprises part of said adsorbent body.

7. An ozone storage package comprising a container; an ozone adsorbent body in said container, at least part of said adsorbent body having an ozone-decomposing activity whereby the rate of decomposition is (1) less than 5% of the total adsorbed ozone per 24 hours at temperatures below —75° C., (2) between 2% and 20% by weight of the total adsorbed ozone per 24 hours at temperatures between —50 and —25° C. and (3) at least 1% by weight of the total adsorbed ozone per minute at temperatures above 0° C. when the ozone loading is at least one pound per 100 pounds of said adsorbent body; means for cooling and maintaining said adsorbent body at a temperature below about —50° C.; and means for introducing an ozone-containing gas to said container for adsorption of the ozone.

8. An ozone storage package according to claim 7 in which said adsorbent body is a crystalline zeolitic molecular sieve having an apparent pore size of at least 4 Angstrom units, and in which at least one-half of the metal cations have been replaced by hydrogen ions.

9. An ozone storage package according to claim 7 in which said adsorbent body is Zeolite X in which at least one-half of the metal cations have been replaced by hydrogen ions.

10. An ozone storage package according to claim 7 in which said adsorbent body is a mixture of silica gel, and a crystalline zeolitic molecular sieve having an apparent pore size of at least 4 Angstrom units and in which at least one-half of the metal cations have been replaced by hydrogen ions.

11. An ozone storage package according to claim 7 in which said adsorbent body is a mixture of silica gel, and Zeolite X in which at least one-half of the metal cations have been replaced by hydrogen ions.

References Cited in the file of this patent

UNITED STATES PATENTS

| | | |
|---|---|---|
| 2,843,219 | Habgood | July 15, 1958 |
| 2,893,512 | Armond | July 7, 1959 |
| 2,928,529 | Grosse et al. | Mar. 15, 1960 |
| 2,962,449 | Gaines | Nov. 29, 1960 |